(12) United States Patent
Chen

(10) Patent No.: US 7,840,746 B2
(45) Date of Patent: Nov. 23, 2010

(54) ENCODING METHOD FOR FLASH MEMORIES

(75) Inventor: Yung Hsu Chen, Hsinchu (TW)

(73) Assignee: Macronix International Co., Ltd, Hsinchu (TW)

( * ) Notice: Subject to any disclaimer, the term of this patent is extended or adjusted under 35 U.S.C. 154(b) by 408 days.

(21) Appl. No.: 11/946,146

(22) Filed: Nov. 28, 2007

(65) Prior Publication Data

US 2009/0138651 A1    May 28, 2009

(51) Int. Cl.
    *G06F 13/00*     (2006.01)
    *G06F 13/28*     (2006.01)
    *G11C 11/34*     (2006.01)
    *G11C 16/04*     (2006.01)

(52) U.S. Cl. ............... 711/103; 711/154; 711/E12.008; 365/185.01; 365/185.18

(58) Field of Classification Search ................ 711/103, 711/154, E12.008; 365/185.01
    See application file for complete search history.

(56) References Cited

U.S. PATENT DOCUMENTS

2003/0046483 A1 *   3/2003   Moschopoulos ............ 711/103

* cited by examiner

*Primary Examiner*—Matt Kim
*Assistant Examiner*—Edward J Dudek, Jr.
(74) *Attorney, Agent, or Firm*—Volpe and Koenig P.C.

(57) ABSTRACT

A encoding method for a flash memory is provided, which can be used for reducing the memory wear and extend the endurance of the memory. The encoding method includes the steps as follows (A) receiving a set of information bits; (B) counting an amount of the information bits needed to be programmed in the set; (C) reversing the set of information bits if the amount of information bits needed to be programmed is less than half of the amount of whole information bits in the set, so that there are more than half of the information bits needed to be programmed in the reversed set; and (D) programming the information bits needed to be programmed in the reversing set, including the reverse flag bit for read out check.

17 Claims, 3 Drawing Sheets

Fig. 1(A)

```
┌──────────────┐     ┌──────────────────┐
│ 11           │     │ 13               │
│ A page of    │ ──► │ Coding counting: │
│ information  │     │ counting the     │
│ bits input   │     │ amount of codes  │
│              │     │ needed to be     │
│              │     │ programmed in    │
│              │     │ the page         │
└──────────────┘     └──────────────────┘
                              │
                              ▼
                     ╱╲ 15
                    ╱  ╲
                   ╱ The ╲
         NO──────►╱amount of╲──── YES ──►┌───────────┐
         │       ╲ codes... ╱            │ 19        │
         │        ╲        ╱             │Programming│
         │         ╲╱                    └───────────┘
         ▼                                     ▲
  ┌────────────┐                               │
  │ 17         │                               │
  │ Inversing  │───────────────────────────────┘
  │ code       │
  └────────────┘
```

```
┌────────────────┐        ┌──────────┐
│ 21             │        │ 23       │
│ Programming    │ ─────► │ erasing  │
│ none-program   │        │          │
│ bits in the    │        └──────────┘
│ page           │
└────────────────┘
```

ENCODING METHOD FOR FLASH MEMORIES

FIELD OF INVENTION

The present invention relates to an encoding method for a memory, and more particularly relates to an encoding method for a floating gate memory.

BACKGROUND

In the recent years, with the increase of portable electronic products, the flash memory technology and commercial application is getting mature. These portable electronic products, such as digital camera, cell phone, Personal Digital Assistant (PDA), Game boy, portable memory, Programmable IC, and Digital Television etc., use Flash memory as the information storage or temporary storage.

A flash memory is a kind of Non-Volatile Memory, which in case of the loss of electricity protects the information stored in the memory from disappearing by changing the threshold voltage of transistor or memory cell to control the switch of the gate and channel in order to access the stored information.

In general, the evaluating standard for the practical efficiency of flash memory includes storage capacity, storing speed, electricity consumption, and life span (taking into account the number of times rewritten) and so on. With the progress of micro processes, the increasing storage capacity as well as storing speed and electricity-consumption reduction of the flash memory are substantially promoted. The progress of the related technology regarding the life span of memory is relatively less so. However, for many consumer electronic products, which usually need to store quantity of information in a short time, such as recordable digital television etc., their life time is often decided by the durability of the memories thereof.

For example, the well known Pause TV needs to continuously write broadcasted television frames into its inner flash memories since a user can press the pause button at any time. Therefore, the flash memories inside the Pause TV always have a shorter life time than other devices.

In the past, common methods adopted for extending the life time of the flash memory are nothing more than to increase the memory capacity or to reduce the bits transmitted rate, i.e. to decelerate the information writing and reading speed to extend the life time of the memory. However, these approaches will substantially decrease the efficiency of the flash memories.

In order to extend the life time of the flash memory and avoid the inefficiency caused by above-mentioned approaches, an encoding method and programming device for the flash memories are provided by the inventor via the devoting research and diligent work.

SUMMARY

In accordance with one aspect of the present invention, an encoding method and programming device for a flash memory is provided to enhance the durability and extend the life time of the memory.

In accordance with another aspect of the present invention, an encoding method for a flash memory is provided, the encoding method comprising:

(A) receiving a set of information bits and encoding the set of information bits into binary codes based on whether the information bits need to be programmed or not, wherein the binary codes comprise a first binary code for those information bits to be programmed and a second binary code for those not to be programmed;

(B) counting respective amounts of information bits encoded as the first binary code and the second binary code;

(C) comparing the amount of the information bits encoded as the first binary code with that of the information bits encoded as the second binary code, and reversing the set of information bits if more than half of the information bits in the set are encoded as the second binary code, so that there are more than half of the information bits are encoded as the first binary code in the reversed set; and (D) programming parts of memory cells in the memory, which are corresponding to the information bits, encoded as the first binary code in the reversed set to have a first threshold voltage.

Preferably, the encoding method further comprises:

(E) programming parts of memory cells in the memory, which are corresponding to the information bits encoded as the second binary code in the reversed set, to have the first threshold voltage; and (F) programming parts of memory cells in the memory, which are corresponding to the set of information bits, to have a second threshold voltage.

Preferably, the first threshold voltage is a relatively higher threshold voltage, and the second threshold voltage is a relatively lower threshold voltage.

Preferably, the step (B) of counting the respective amount of information bits encoded as the first binary code and the second binary code is carried out by an adder.

Preferably, the step (C) of comparing the amount of the information bits encoded as the first binary code with that of the information bits encoded as the second binary codes is carried out by a comparator.

Preferably, the comparator is selected from one of an XOR and an XNOR.

Preferably, the set of information bits further comprises a memory space for recording a reversed state of the set.

Preferably, the set is one of a page and a buffer space.

Preferably, the memory is a flash memory.

Preferably, the memory is a floating gate flash memory.

In accordance with another aspect of the present invention, A memory programming device for storing a set of information bits into a memory is provided, the memory programming device comprising an adder, a comparator, an encoder, and a processor; wherein the adder is configured to count respective amount of the information bits which are needed to be programmed and not needed to be programmed; the comparator is configured to compare the amount of the information bits needed to be programmed with that of the information bits not to be programmed; the encoder is configured to reverse the set of information bits if the amount of information bits needed to be programmed is less than half of the whole information bits in the set, so that there are more than half of the information bits needed to be programmed in the reversed set; and the processor is configured to programming the information bits needed to be programmed.

Preferably, the processor is executing an erasing procedure for reverse programming a set of information bits that is programmed.

Preferably, the processor writes the information bits into memory cells of the memory.

Preferably, the comparator is selected from one of an XOR and an XNOR.

Preferably, the memory is a floating gate flash memory.

In accordance with another aspect of the present invention, a memory programming method is provided, the memory programming method comprising:

(A) receiving a set of information bits;

(B) counting an amount of the information bits needed to be programmed in the set;

(C) reversing the set of information bits if the amount of information bits needed to be programmed is less than half of the amount of whole information bits in the set, so that there are more than half of the information bits needed to be programmed in the reversed set; and (D) programming the information bits needed to be programmed in the reversing set, including the reverse flag bit for read out check.

Preferably, the step of programming the information bits is to input the information bits into memory cells of the memory.

Preferably, the step of inputting the information bits into memory cells of the memory is to program the memory cells corresponding to the information bits to have a first threshold voltage.

Preferably, the erasing procedure is to program the memory cells to have a second threshold voltage.

The above objects and advantages of the present invention will become more readily apparently to those ordinarily skilled in the art after reviewing the following detailed descriptions and accompanying drawings, in which:

BRIEF DESCRIPTION OF THE DRAWINGS

FIG. 1(A) and FIG. 1(B) are flow diagrams showing the encoding method for a memory of the present invention according to the first embodiment of the present invention.

FIG. 3 (A) and FIG. 3(B) are schematic diagrams illustrating the relationship between the cycle time and the durability of the memory.

DETAILED DESCRIPTION OF THE PREFERRED EMBODIMENTS

Figure 2:
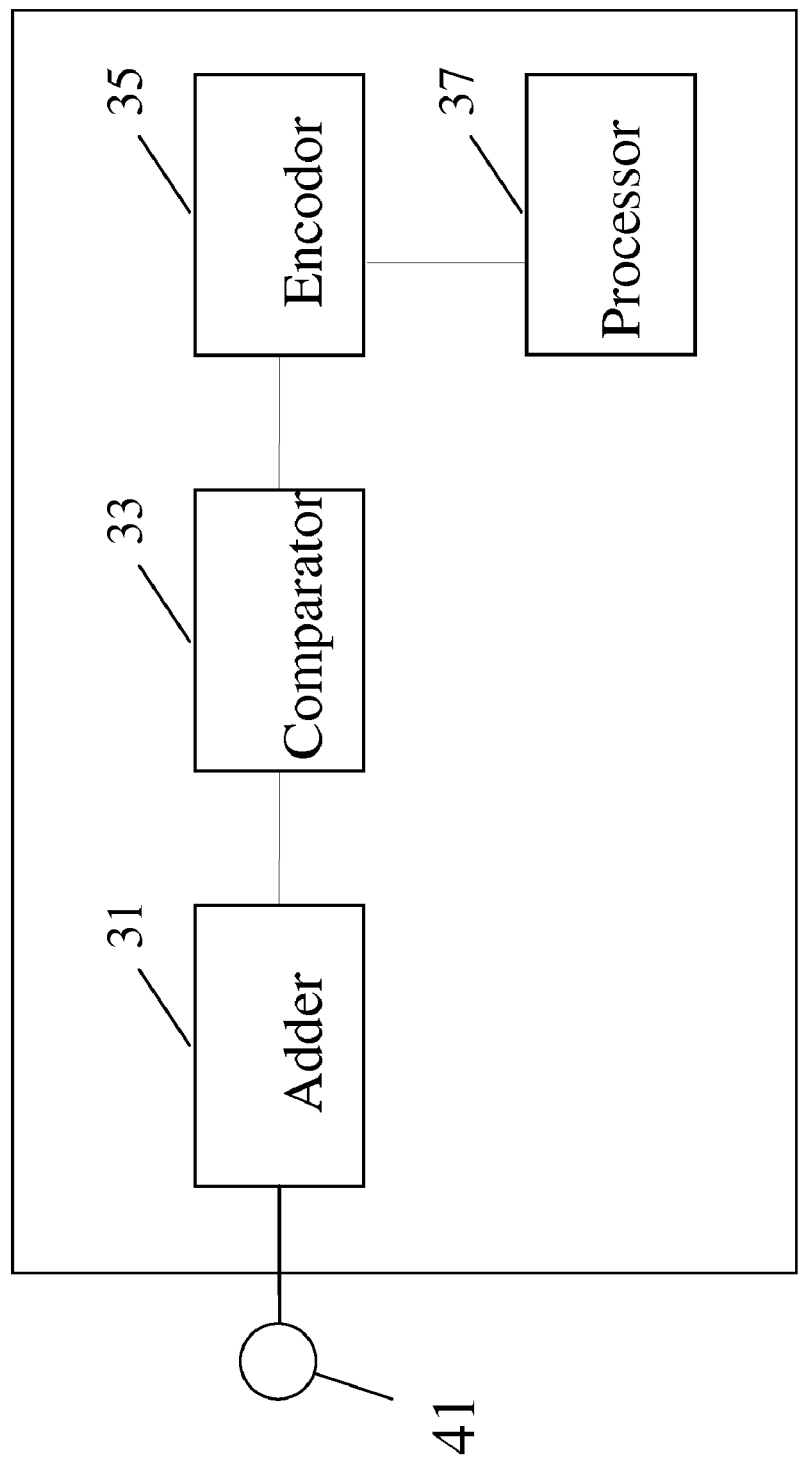
FIG. 2 is a block diagram showing the memory programming device according to the second embodiment of the present invention.

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

In order to describe the control system and the method for tuning the system thereof in the present invention, the multiple preferred embodiments are listed as following. It is to be noted that the following descriptions of preferred embodiments of this invention are presented herein for the purposes of illustration and description only; it is not intended to be exhaustive or to be limited to the precise form disclosed.

Please refer to FIG. 1(A) and FIG. 1(B), which are the flow diagrams showing the encoding method for a memory according to the first embodiment of the present invention. The data reading and writing in a memory are generally processed with a group of bits as a unit, i.e. a page or a buffer space. In the present embodiment, a page of information bits is taken as a unit for transmitting, there are 128 bits or 512 bits are taken in a page in the memory reading and writing processes. As shown in FIG. 1(A), the flow chart 10 shows the process of writing a set of information bits into a memory, while the flow chart 20 in FIG. 1(B) shows the data erasing procedure in a memory.

In the flow chart 10, a page of information bits (step 11) is received, then an amount of the information bits needed to be programmed in the page is counted (step 13); if the amount of information bits needed to be programmed is less than half of the amount of whole information bits in the page, the page of information bits is reversed (steps 15 and 17) so that there are more than half of the information bits needed to be programmed in the reversed page, and then the information bits needed to be programmed in the reversed page are programmed (step 19); on the contrary, if the amount of information bits needed to be programmed is more than half of the amount of whole information bits in the page, the reverse encoding process is not carried out and the information bits originally received are programmed directly (step 19).

In the step 11, the information bits in the page are encoded into binary codes based on whether the information bits need to be programmed or not, for example, the information bits need to be programmed are encoded as binary 1 and the ones need not to be programmed are encoded as binary 0. The amounts of the information bits encoded as binary 1 and binary 0 in the page are counted respectively in the step 13, and then the amounts of the information bits encoded as binary 1 and binary 0 in the page are compared with each other in step 15.

If the amount the information bits encoded as binary 0 is larger than those encoded as binary 1 in the page, the page of information bits is reversed by replacing the binary 0 with binary 1 and the binary 1 with binary 0, so that there are more than half of the information bits encoded as binary 1 in the reversed page, in other words, there are more than half of the information bits, which need to be programmed, and then the information bits encoded as binary 1 are programmed in step 19. On the contrary, if the amount the information bits encoded as binary 0 is less than those encoded as binary 1 in the page, the page of information bits are directly programmed in step 19.

After the process in step 19, the page of information bits is written into the memory, which is further provided with a record space for recording the reversing state thereof. If the page of information bits has been reversed in the process of being written into the memory, a recovered reversing process is carried out when the page of information bits are read out from the memory, i.e. the reversed binary 1 is recovered as original binary 0 and the reversed binary 0 as original binary 1 in the reading process.

In the above-mentioned process, programming the information bits is meant to input the information bits into the corresponding memory cells of the memory, which is carried out by programming the memory cells corresponding to the information bits encoded as binary 1 to have a first threshold voltage.

An erasing procedure in the floating gate flash memory includes programming the remaining information bits which have not been programmed in the page in advance, i.e. the memory cells corresponding to the page are all programmed to have a first threshold voltage, as shown in step 21, and then executing an erasing procedure as shown in step 23. After the erasing procedure the memory cells in the memory come into the original state without information inputted and are ready for the next information inputting.

There are many counting methods that can be adopted in step 13 for counting the respective amounts of information bits encoded as the first binary code and the second binary code in the page, such as an adder or a full adder. In step 15, a comparator can be adopted to comparing the amount of the information bits needed to be programmed, such as the logic comparator as an XOR or an XNOR.

The process of the memory cells in a memory programmed to have the first threshold voltage and then erased to have a second threshold voltage is named as a "cycle". The time for each cycle is one of the main factors to influence the durability of the memory. While the shorter the time for each cycle is, the durability of the memory is reduced. Flash memories always need to be programmed before erasing. This purpose is to avoid erasing non-uniformity, i.e. so called "over erase". We firstly program as many bits as possible to better assure that over ½ page bits are in program state. Then we can say that over ½ page bits are paused, until the next erasing.

Figures 3A, 3B:
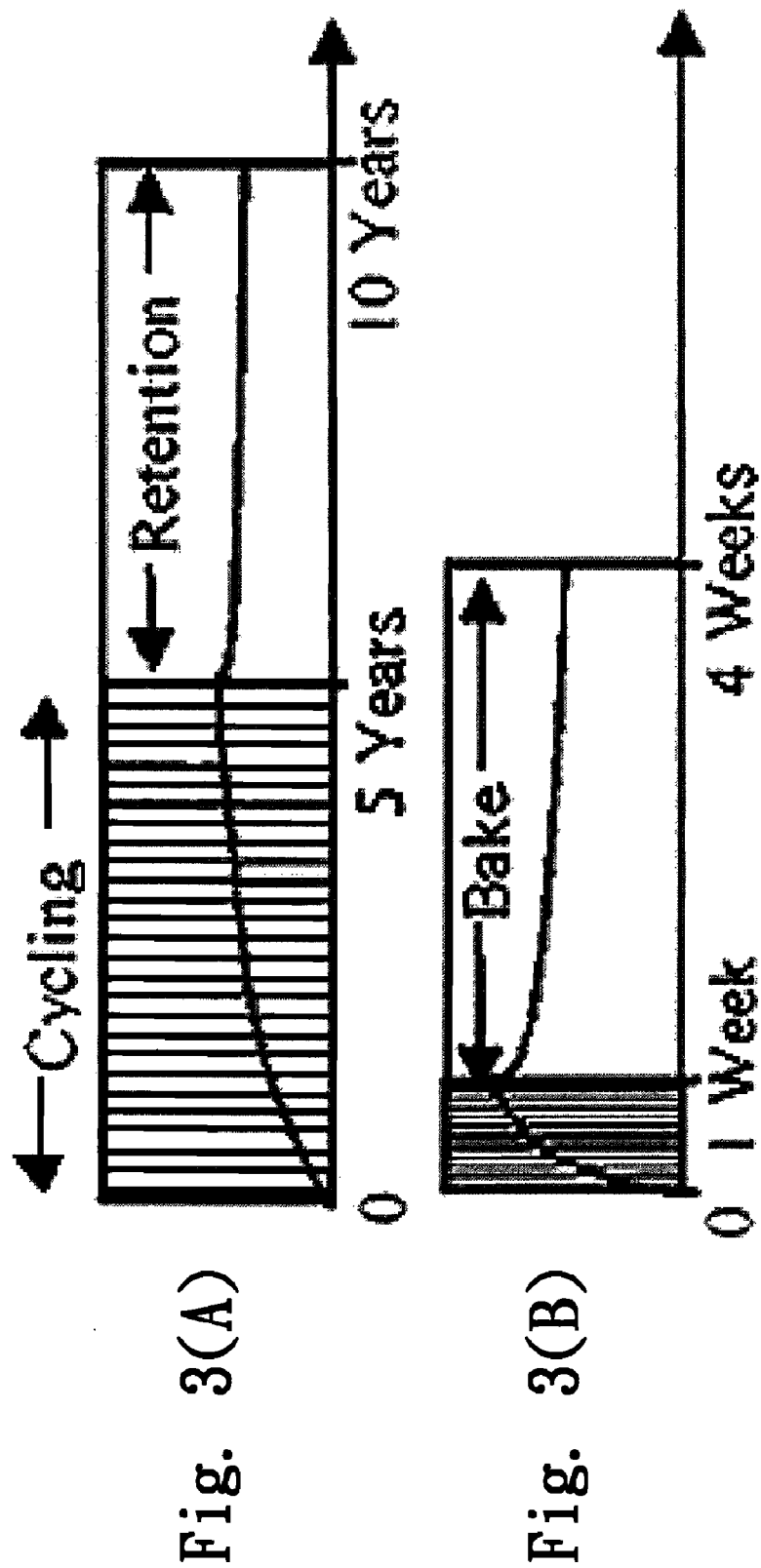

Please refer to FIG. 3(A) and FIG. 3(B), which are the schematic diagrams illustrating the relationship between the cycle time and the durability of the memory, wherein the X-axis represents the time for operation and durability of a memory and the Y-axis represents the threshold voltage, especially the high threshold voltage, of the memory. As shown in FIG. 3(a), under the situation that all cycling operations, i.e. 10000 cycles, of the memory are distributed in 5 years, the threshold voltage decay of the memory is slow, so that the life time of the memory can be extended to 10 years. On the contrary, as shown in FIG. 3(b), the threshold voltage decay of the memory becomes fast under the situation that all cycling operations are distributed in a week, and thus the life time of the memory can only be extended to 4 weeks.

The threshold voltage of the memory cells in the floating gate memory are adjusted by moving the electrons into or out of the floating gate in the memory cell structure. A memory cell is provided with a higher threshold voltage when the electrons are moved into the floating gate thereof, and provided with a lower threshold voltage when the electrons are moved out the floating gate thereof. The variations of the lower and higher threshold voltages are used for define the binary 0 and binary 1.

When the electrons move into or out of the floating gate, the electrons pass through the interface between the floating gate and the source and the drain, which causes slight damages to the interface. The damages to the interface caused by the electrons passing through are usually recovered by itself, but with the electrons moving into and out of the floating gate more frequently the interface is more likely consumed because of electrons frequently passing through. A consumed interface leads to the electrons passing through the interface and going away from the floating gate unexpectedly, which is called the effect of "Interface Trap Charges", so that the ability for saving data of the memory is reduced, i.e. the durability of the memory is reduced.

The erasing procedure of the memory shown in the flow chart 20 is a fast and continuous procedure, wherein the memory cells which have not been programmed in the preceding writing process are programmed to have the second threshold voltage immediately after being programmed to have the first threshold, that means the electrons move into and out of the floating gate of those memory cells, such that the interface of the floating gate of those memory cells becomes more damaged.

The most excellent effect of the reverse encoding method of the present invention lies in that: more amount of memory cells are programmed in the data writing procedure, i.e. more than half of the amount of memory cells in the page are programmed to have the first threshold voltage, and then the programmed memory cells are kept in a paused state in the period of data storage procedure of the memory. Afterward when a data wiping procedure is executed, the previously programmed memory cells only need to be programmed once to have the second threshold voltage, so that the floating gate interfaces of the previously programmed memory cells are provided with more recovery time, and damage to the memory cells is reduced consequently.

The above-mentioned method can be implemented as a memory programmed device. Please refer to FIG. 2, which is a block diagram showing the memory programming device according to the second embodiment of the present invention. As shown in FIG. 2, a memory programmed device 30 includes an adder 31, a comparator 33, an encoder 35, and a processor 37. A page of information bits is received from a portal 41, wherein the adder 31 is configured to count the amount the information bits which are needed to be programmed and not needed to be programmed in a page received from a portal 41; the comparator 33, such as XOR or XNOR, is configured to compare the amount of the information bits needed to be programmed with that of the information bits not to be programmed; the encoder 35 is configured to reverse the page of information bits if the amount of information bits needed to be programmed is less than half of all of the information bits in the page, so that there are more than half of the information bits needed to be programmed in the reversed page; and the processor 37 is configured to program the information bits needed to be programmed.

The mentioned information bits are always encoded as binary codes for their demand based on whether the information bits need to be programmed or not, wherein programming the information bits is meant to write the information bits into the corresponding memory cells in the memory. As for a common flash memory, the processor 37 is configured to adjust the threshold voltage of the relational memory cells based on whether the corresponding information bits need to be programmed or not, for example, to lift the threshold voltage of the corresponding memory cells from a lower voltage to a higher voltage, so as to shown the binary 1 and binary 0 of the input information.

The processor 37 is further configured to execute a reverse programming process. As for common flash memories, the reverse programming process is meant to adjust the memory cells to have their initial threshold voltage.

As to all flash memories which are damaged by the effect of interface trap charges, the method and device provided in the present invention can be applied for reducing the damages to the floating gate interface, and thus enhancing the durability and extending the life time of the memory.

In sum, the encoding method and device provided for a memory in the present invention has the advantages of enhancing the durability and extending the life time of the memory. Accordingly, the present invention can effectively solve the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An encoding method for a memory having a plurality of memory cells, comprising:
    (A) receiving a plurality of binary codes, wherein the binary codes comprise a first binary code for programming and a second binary code for non-programming;

(B) counting an amount of at least one of the first binary code and the second binary code;

(C) reversing the binary codes if more than half of a whole amount of the binary codes are encoded as the second binary code; and (D) programming the memory cells in the memory corresponding to the first binary code.

2. The encoding method according to claim 1, wherein the step (D) further comprises:
   programming a reverse flag bit for read out check.

3. The encoding method according to claim 1, wherein the counting step (B) is carried out by an adder.

4. The encoding method according to claim 1, wherein the binary codes have a unit of one page.

5. The encoding method according to claim 1, wherein the memory is a flash memory.

6. The encoding method according to claim 1, wherein the memory is a floating gate flash memory.

7. An encoding method for a memory having a plurality of memory cells, comprising:
   (A) receiving a plurality of binary codes, wherein the binary codes comprise a first binary code for programming and a second binary code for non-programming;
   (B) counting an amount of at least one of the first binary code and the second binary code;
   (C) reversing the binary codes if the amount of the first binary code is less than half of a whole amount of the binary codes; and
   (D) programming the memory cells in the memory corresponding to the first binary code.

8. The encoding method according to claim 7, wherein the step (D) further comprises:
   programming a reverse flag bit for read out check.

9. The encoding method according to claim 7, wherein the counting step (B) is carried out by an adder.

10. The encoding method according to claim 7, wherein the binary codes have a unit of one page.

11. The encoding method according to claim 7, wherein the memory is a flash memory.

12. The encoding method according to claim 7, wherein the memory is a floating gate flash memory.

13. A memory device, comprising:
    an adder for counting an amount of a set of information bits which are needed to be programmed or not needed to be programmed;
    a comparator for comparing the amount of the set of information bits needed to be programmed with half of a whole amount of the set of information bits; and
    an encoder for reversing the set of information bits if the amount of the set of information bits needed to be programmed is less than half of the whole amount of the set of information bits.

14. The memory device according to claim 13, wherein the comparator comprises one of a XOR and a XNOR gates.

15. The memory device according to claim 13, wherein the memory is a floating gate flash memory.

16. A memory programming method, comprising:
    (A) receiving a set of information bits;
    (B) counting an amount of the information bits needed to be programmed in the set;
    (C) reversing the set of information bits if the amount of information bits needed to be programmed is less than half of the amount of whole information bits in the set, so that there are more than half of the information bits needed to be programmed; and
    (D) programming the information bits needed to be programmed.

17. The memory programming method according to claim 16, the step (D) further comprising:
    programming a reverse flag bit for read out check.

* * * * *